United States Patent [19]
Weihe

[11] 3,746,846
[45] July 17, 1973

[54] POLAR TO RECTILINEAR CHART SYSTEM

[75] Inventor: Vernon I. Weihe, Arlington, Va.

[73] Assignee: Vega Precision Laboratories, Incorporated, Vienna, Va.

[22] Filed: Apr. 1, 1971

[21] Appl. No.: 130,323

[52] U.S. Cl........ 235/150.27, 235/150.26, 235/186, 343/112 PT, 235/61.11 R, 235/61.12 R
[51] Int. Cl............................................... G06g 7/78
[58] Field of Search.................. 235/150.26, 150.27, 235/186, 189, 191; 307/234; 328/133; 343/6 DF, 10, 12 R, 12 A, 16 R, 112 PT

[56] References Cited
UNITED STATES PATENTS

| | | | |
|---|---|---|---|
| 3,414,901 | 12/1968 | Perkins et al. | 235/150.27 UX |
| 3,075,190 | 1/1963 | Laporte | 235/150.27 X |
| 2,943,321 | 6/1960 | Karpeles | 235/150.26 X |
| 3,581,073 | 5/1971 | Visher | 235/150.26 |
| 3,359,408 | 12/1967 | Briggs | 235/150.27 |
| 3,058,661 | 10/1962 | Summers | 235/191 |
| 3,097,357 | 7/1963 | Durnal | 235/150.27 X |
| 3,160,878 | 12/1964 | Galloway | 235/191 X |
| 3,474,556 | 10/1969 | Scovill | 343/112 PT X |
| 3,505,640 | 4/1970 | Cohen | 235/150.27 X |

Primary Examiner—Eugene G. Botz
Assistant Examiner—Jerry Smith
Attorney—Brich, Swindler, McKie & Beckett

[57] ABSTRACT

A system which employs electro-mechanical and electronic hybrid (analog/digital) semi-conductor techniques to select a desired chart for display and to position a symbol thereon to conform with an operator referenced zero point and a polar vector (angle and distance) input.

14 Claims, 7 Drawing Figures

Patented July 17, 1973

POLAR TO RECTILINEAR CHART SYSTEM

BACKGROUND OF THE INVENTION

A. Field of the Invention

This invention relates to an air, marine or vehicular navigation system which employs a navigational computer utilizing both analog and digital techniques to set-up and pictorially display a symbol's position throughout a particular sequence selected by the operator and programmed into the computer by electro-mechanical means.

More particularly, the disclosed embodiment relates to an aircraft navigation system using pilot selectable reference information which responds to a selected point source Rho-Theta (VOR/DME, VORTAC/TACAN) ground station within the limitation of its coverage area.

B. Description of the Prior Art

Airborne navigation systems which pictorially display the position of the aircraft with respect to a map of the flight area using signals from a selected point source Rho-Theta ground station, are known.

These prior art airborne navigation systems fall generally into two categories: those which use paper charts or maps showing the flight area or those which project an image of the flight area contained on a roll of film. Where paper charts or maps are used, the pilot would have to manually select the proper chart from a large group of charts and position it on a rotatable table beneath an indicator arrow movably mounted on a carriage positioned above the table. Inasmuch as the area covered by any one chart is small, the aforementioned selection and positioning of the proper chart had to be done numerous times during a flight thus greatly increasing the work load of the pilot.

Numerous disadvantages are also present in the prior art navigation systems which project an image contained on film of the area being traversed by the aircraft. Inasmuch as there are approximately seven hundred ground stations in the United States alone, each ground station and the area surrounding it would be placed on a separate film frame thus requiring the pilot to view several hundred film frames before locating the proper ground station thereby increasing his work load significantly. If the film broke as it often did, the pilot would have to dismantle the apparatus and repair the film in flight. Further, if the ground station in a particular area had been moved or its operation discontinued, the film would have to be cut and a new frame patched in to reflect the change. Film systems which automatically select the proper film frame and position a symbol of the aircraft with respect thereto are large and have complex and costly computer elements such as clocks, memories, logic systems, read/write exchanges, stored programs, etc. thus rendering them suitable for use only on large aircraft.

SUMMARY OF THE INVENTION

The present invention provides a pictorial navigation system for aircraft which enables the pilot to accurately observe and if desirable record, the position of the aircraft following an arbitrary course anywhere with respect to a selected ground station while at the same time receive the usual bearing, distance-to-go and left-right guidance without the use of a complex and costly digital computer and projection system used in the prior art. The present invention further reduces the work load on the pilot to a negligible amount.

The navigation apparatus for aircraft exemplifying the invention is electro-mechanical employing hybrid, solid state (analog/digital) techniques to accomplish area navigation throughout the coverage volume of ground based stations emitting Rho-Theta reference information (VOR/DME, VORTAC, TACAN), hereinafter referred to as the "reference signal source." The apparatus extracts and operates on the Rho-Theta information received by conventional radio receivers presently in operational aircraft to thereby position a symbol of the aircraft in relation to a display of the areas that flight is to take place and thus provide assistance to the pilot en route and terminal.

The display of the area over which radial off-radial flight is to take place is contained on a roll chart, the movement of which is effected by a servo motor energized by means of an amplifier. The amplifier energizes the servo motor to position a segment of the roll chart displaying the area the aircraft is traversing in response to information supplied thereto in a manner to be described later.

A second amplifier energizes a second servo-motor to position a symbol of the aircraft above the segment of the roll chart being traversed by the aircraft. The X and Y coordinates of the symbol are computed by extracting and operating on the Rho-Theta information in a manner to be presently described.

In order set-up the roll chart and symbol for a continuous pictorial display of the aircrafts flight, the following preset conditions or information must be supplied to the system: direction of chart travel, the proper chart of the general area to be traversed during a leg of the flight plan; the Northing and Easting positions of the reference signal source, the Height of the reference signal source above sea level, and the correction of the Magnetic to true North position of the reference signal source.

The foregoing preset conditions which will exist for each segment of a flight plan are contained on a read only memory in the form of, for example, notched rods or keys having thirty or more bit locations, there being one rod for each such segment. A specific number of bit locations of the rod represent digital words as chart direction, chart number, etc. In one form of the present invention, a plurality of summing operational amplifiers are operated sequentially to provide precise D.C. voltages corresponding to the digital words contained on the rod. These precise D.C. voltages are then supplied to the operational amplifiers controlling the roll chart and aircraft symbol servo motors.

In order to set up the pictorial display for a flight to a specific destination, the pilot chooses a cassette of the rods or keys containing predetermined information associated with each reference signal source to be used during the flight plan. If the total flight plan is in the vicinity of only one reference signal source, only a single rod containing information with respect to that station need be selected. The pilot then inserts the rod representing the first reference signal source in the first segment of the flight plan into an aperture of a control box containing the summing operational amplifier circuits. A sequentially actuated rotary switch or stepping relay is employed having four positions; home, second, third and fourth which connect the operational summing amplifier circuits to a plurality of switches which are actuated by means of the bit locations on the rod to thereby provide the precise D.C. voltage representing the aforementioned digital words.

With the rotary switch in its "home" position, a voltage representing chart direction may be manually selected or it may be inserted by means of a digital word on the rod. The position servomotor of the roller map runs until its voltage equals that of the manually set voltage. The intersection or zero point of the X-Y coordinate system of the chart displaying the general area to be traversed by the aircraft is then in place and a voltage balance exists. At this voltage balance the rotary switch moves to position "two," where a precise D.C. voltage indicative of the specific chart number within the general area is generated by the summing operational amplifier circuits corresponding to the digital word contained on the rod. The roller map then runs until its back voltage reaches parity and the required chart number is then in position. The rotary switch then moves to the "third" position wherein the position of the reference signal source is properly located three dimensionally $(x,y,z)$ on the chosen Numbered Chart. At this position, the digital word on the rod for the Northing and Easting position of the reference signal source is extracted and acted on by the summing operational amplifier circuits as is the digital word for the variation of magnetic to true north to provide precise D.C. voltages which are fed to the amplifiers controlling the roller map and aircraft symbol to thereby position them at the position of the reference signal source. In addition, the digital word for the height of the reference signal source is extracted from the rod and acted on together with a D.C. voltage representing the altitude of the aircraft by the summing operational amplifiers to provide a precise D.C. voltage indicative of the altitude of the aircraft above the reference signal source. This D.C. voltage is combined with the slant range from the aircraft to the reference signal source in an electronic module to provide the horizontal or chart range of the aircraft from the reference signal source. The D.C. output from the electronic module is then fed to the operational amplifiers associated with the roller map and aircraft symbol to accurately portray the air position of the aircraft on the roll chart.

After the precise position of the reference signal source is located on the map with respect to true North and the aircraft symbol is positioned relative thereto a distance equal to the actual ground distance of the aircraft from the reference signal source, a "beep" signal can be sounded to enable the pilot to slew to correct minor errors or push a release button which confirms that the system is correctly set up to work on the particular reference signal source represented by the rod selected. The rotary switch then moves to the "fourth" position which is the latch mode, whereupon the movement of the roll chart and aircraft symbol are dependent upon the signals received from the reference signal source. The system will stay in the latch mode until there is a discontinuity of the received reference signal or until a rod is selected and inserted containing a new word group signifying that the pilot no longer wishes to operate on this particular reference signal source, chart or chart direction as the case may be.

After the rod containing the word group is inserted into the aperture of the control box, the digital words representing precise D.C. voltages automatically position the roll chart and aircraft symbol for operation on the reference ground station represented by the rod in a matter of seconds.

In a second embodiment of the present invention, the rotary switch used to sequentially set up the system for operation on a selected reference signal source is eliminated as are the summing amplifier circuits and are replaced by a digital to analog converter. Thus, when the notched rod containing the aforementioned digital words is inserted to actuate the switches, the digital to analog converter automatically produces the precise D.C. voltages to set up or position the roll chart and symbol for operation on a selected reference signal source all at once without the necessity of setting up the system sequentially by means of the rotary switch.

The foregoing brief summary of this invention and the detailed description to follow set forth the invention as it would be used in an aircraft, however, it should be understood the principles and apparatus disclosed could be used equally well for any mobile craft or laboratory instrument having sensors which provide inputs of Rho(range)-Theta (bearing) information to the apparatus of the present invention.

REFERENCE DATA SOURCES

Figure 1:
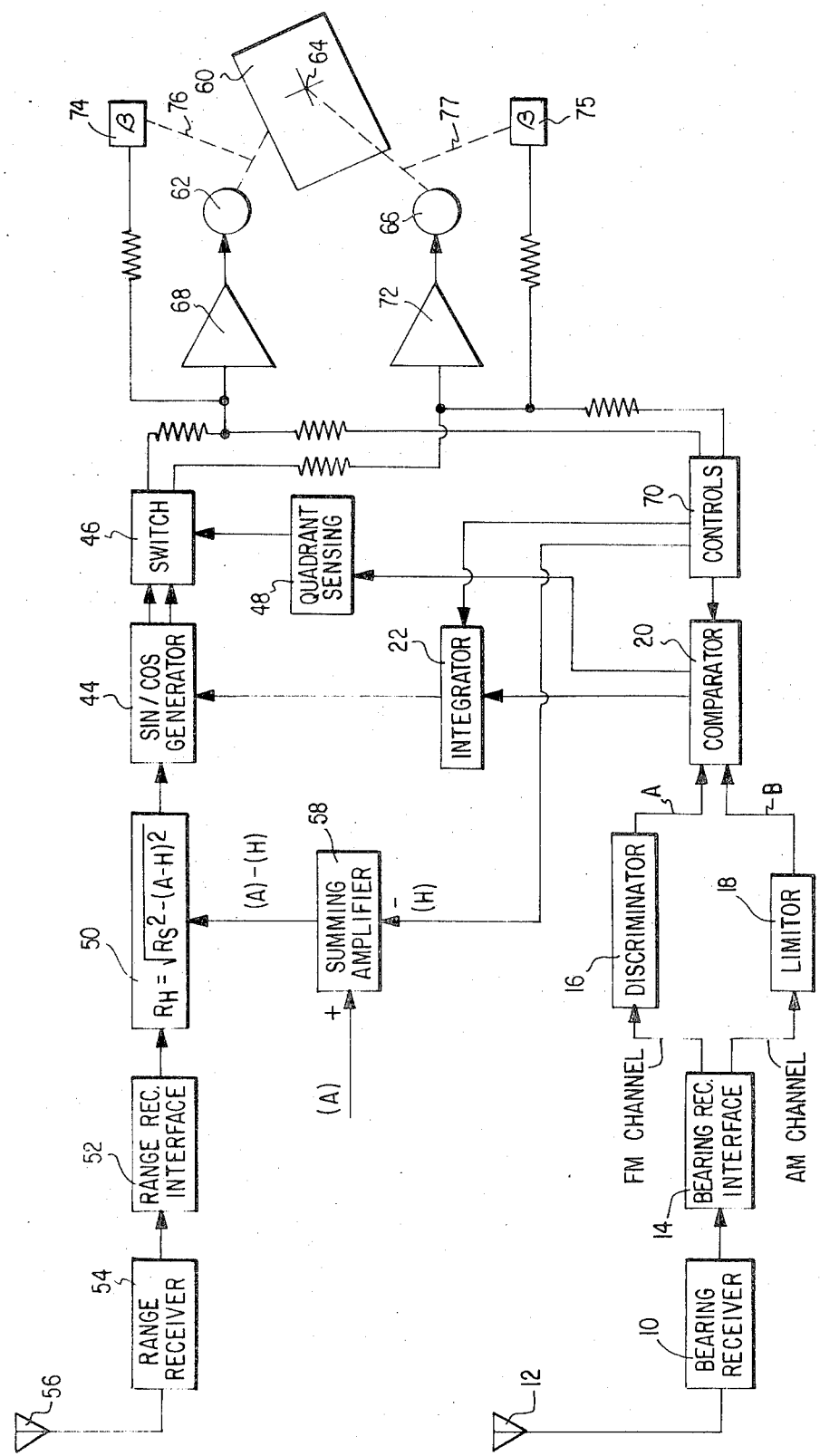
FIG. 1 is a block diagram of the navigation system of the present invention.

The airborne pictorial navigation system of the present invention is shown in FIG. 1 in block diagram form. In the embodiment disclosed, the navigation system is adapted for use in aircraft and takes advantage of existing radio receiving equipment already on board. Such existing equipment consists of a receiver 10 capable of producing sinusoidal signal information on the bearing of transmitting stations to which it is tuned. When the receiver 10 is tuned to the frequency of a selected reference signal source, the receiver translates the received bearing signal into a voltage signal which denotes the bearing of the aircraft from the reference signal source, or vice versa, with respect to magnetic north.

The existing on board equipment also includes a radio DME receiver 54 which is an interrogation receiver producing sinusoidal signal information on the distance of the aircraft from the reference signal source to which it is tuned. These omni-transmitting and distance measuring equipment radio stations are sited throughout the world and are referred to as VOR/DME, VORTAC and TACAN transmitting stations. The invention provides a further source of reference data by way of a navigational chart 60 which is contained on a roll and which shows, in addition to other related information, the terrain of the area to be traversed by the aircraft as well as the various aforementioned transmitting stations.

Additional reference information such as the direction of movement of the roll chart, the specific chart of the area to be traversed, the northing and easting position of the reference signal source, the height of the reference signal source above sea level and the correction of the bearing of the reference signal source from magnetic to true North, is also introduced into the system by electromechanical means to be described later to thereby pictorially indicate the position of the aircraft on the proper chart and with respect to the selected reference signal source.

GENERAL DESCRIPTION OF INVENTION

Figure 1B:
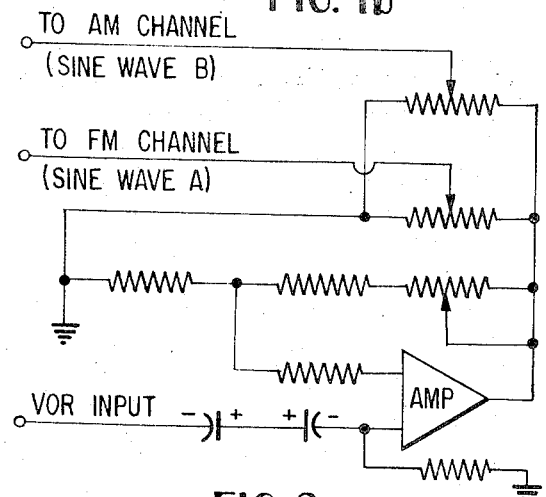
FIG. 1b is a schematic of the bearing receiver INTERFACE circuit.
Figure 1C:
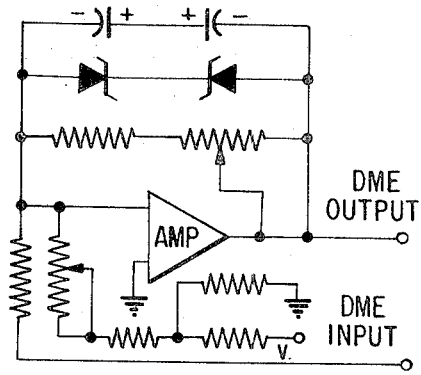
FIG. 1c is a schematic of the range receiver INTERFACE circuit.

Referring more particularly to FIG. 1, the bearing of the aircraft is measured by a conventional radio receiver 10 which receives bearing determining signals from, for example, a VOR/DME ground based reference signal source over antenna 12. The voltage output of the bearing radio receiver 10 indicative of the bearing to the reference signal source is an amplitude modulated subcarrier with frequency modulation which is fed to a bearing receiver interface circuit 14 which enables the present navigation system to be adapted to conventional bearing radio receiver 10 present in existing aircraft. The structural details of bearing receiver interface circuit 14 will be described later. The signal received from the conventional VOR/DME ground station is two independent 30 Hz sine waves, one of which acts as a reference while the other changes through 360° as the aircraft flies a circle around the station. Interface circuit 14 is a buffer amplifier circuit such as that shown for example in FIG. 1b which isolates the bearing radio receiver 10 and provides two outputs one of which is a frequency modulated FM subcarrier channel from which is obtained a reference phase signal and an amplitude modulated AM channel from which is obtained a signal that varies in phase. The FM subcarrier channel is then fed to a conventional discrimination circuit 16 which extracts the FM component of the 9960 signal which then serves as a FM reference signal. The AM channel is fed to a conventional limiting circuit 18 which rejects the carrier phase to produce the 30 Hz variable phase signal.

The 9960 FM signal from the discrimination circuit 16 and the 30 Hz variable phase signal from the limiting circuit 18 are then fed to a comparator 20 to produce a signal, designated Theta, which is indicative of the direction of travel of the aircraft with respect to a selected ground based reference signal source.

The phase relationships between the FM reference and AM variable phase signals along four lines of azimuth leading from the reference signal source are such that at north (0° azimuth) the two signals are exactly in phase. At east (90° azimuth), the AM variable phase signal lags the FM reference phase signal by 90°. At south (180° azimuth), the AM variable phase signal lags the FM reference phase signal by 180°. At west (270° azimuth), the AM variable phase signal lags the FM reference phase signal by 270°. At all other azimuth, the phase difference between the FM reference phase and AM variable phase signals, in electrical degrees, is equivalent to the bearing in degrees of azimuth. The FM reference and AM variable phase signals are compared in comparator 20 to generate a pulse of operation information as will be presently described.

Figure 1A:
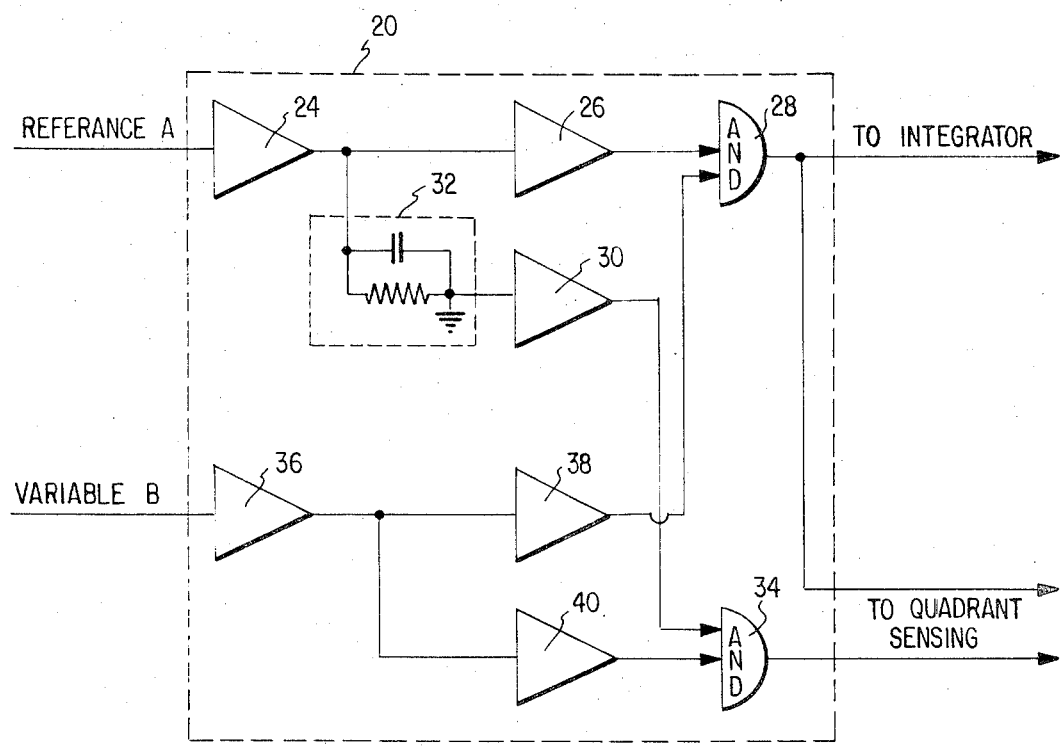
FIG. 1a is a block diagram of the comparator circuit.

Referring to FIG. 1a, comparator 20 has as inputs the sinusoidal FM reference signal from discriminator 16 and the sinusoidal AM variable phase signal from limitor 18. The FM reference signal is then amplified at 24 and in one instance fed to amplifier 26 where the sinusoidal wave is converted into a square wave which is then fed to an AND gate 28 and in a second instance to amplifier 30 through resistance-capacitance network 32, the function of which will be described later. Amplifier 30 also serves to square the sinusoidal wave and feed it to AND gate 34.

The AM variable phase signal is amplified at 36 and fed into amplifiers 38 and 40 where the sinusoidal wave is converted into a square wave. The square wave output of amplifier 38 is fed to AND gate 28 and the square wave output of amplifier 40 is fed to AND gate 34.

As the AM variable phase signal moves with respect to the FM reference signal as previously described, a phase width modulated output pulse will appear at the output of AND gate 28. The pulse width modulated signal from AND gate 28 is then fed to a conventional integrator 22. Integration of the pulse width modulated signal provides a D.C. voltage which varies from 0 to 10 volts representing 0° to 180° of phase difference and from 10 to 0 volts representing 180° to 360° of phase difference or angle Theta. The D.C. voltage from integrator 22 is then fed to a conventional sin/cosine generator 44 which generates sine Theta and cosine Theta information with respect to two of the aforementioned four quadrants of operation. In order for the sine/cosine generator 44 to provide information on the other two quadrants, the output therefrom is fed to a switch 46. Switch 46 is actuated by a pulse which is generated at the instant 0° or 180° of phase difference exists between the FM reference signal and the AM variable phase signal.

A quadrant sensing circuit or comparator 48 is provided for generating the pulse to actuate switch 46 in response to a slight difference in the phase of the input pulses thereto from AND gates 28 and 34. This slight phase difference is selected to occur at 0° and 180° and is accomplished by means of the resistance-capacitance network 32 which introduces a slight "lead" in the FM reference signal from amplifier 24.

It should be noted that in the event a sine/cosine generator 44 is used which is capable of generating sine Theta and cosine Theta information with respect to all four quadrants the switch 46, quadrant sensing comparator 48 and the additional AND gate circuit 34 in comparator 20 would be eliminated.

In addition, integration of the pulse width modulated signal can also be operated on to permit injection of a correction factor for magnetic variation, i.e., correction of the bearing of the ground based reference signal source from magnetic to true North. The source of the aforementioned correction factor will be discussed later with regard to control 70.

In addition to information on the bearing (Theta) of the aircraft with respect to a reference signal source, the ground range $R_H$ from the aircraft to the reference signal source must be determined in order to accurately portray the position of the aircraft on a chart disclosing the point or location of the reference signal source.

The distance between the aircraft and the reference signal source, or slant range $R_S$ as it is more commonly called, is received in the form of a radio signal, for example, a VOR/DME ground based reference signal source by the on board interrogation receiver 54 via antenna 56. The slant range $R_S$ signal received by the receiver 54 is fed to a range or distance receiver interface circuit 52, which like the bearing receiver interface circuit 14, enables the present navigation system to be adapted to conventional distance receivers 54 present in existing aircraft. The distance receiver interface circuit 52 converts the signal received by the distance receiver 54 into a D.C. voltage representing the slant range $R_S$ from the aircraft to the reference signal source ground station.

In order to determine the ground range $R_H$ from the aircraft to the reference signal source ground station, Pythagorean theorem, $R_H^2 = R_S^2 - (A-H)^2$ is used where:

$R_H$ = Ground Range
$R_S$ = Slant Range between aircraft and reference signal source
$A$ = Altitude of aircraft above sea-level
$H$ = Height of the location of the reference signal source above sea-level The altitude of the aircraft above sea level A is supplied in the form of a D.C. voltage from conventional altitude measuring equipment, such as a barometric altimeter, present on all aircraft. The D.C. voltage A is combined in a Summing Operational Amplifier 58 with a D.C. voltage H representing the height of the location of the reference signal source above sea level to provide a D.C. voltage (A–H which is the height of the aircraft above the location of the reference signal source. The D.C. voltage H is furnished in a manner to be described later.

The output A–H of the Summing Operational Amplifier 58 is fed to a square rooting circuit 50, which may be, for example, of the type set forth in U.S. Pat. No. 2,879,002 issued Mar. 24, 1959, where it is operated on together with the slant range input $R_S$ from the DME interface 52 to produce a D.C. voltage equal to $R_S^2 - (A-H)^2$ which is the horizontal or ground range value $R_H$. The ground range value $R_H$ is necessary to accurately portray the air position of the aircraft on a roll chart in a manner to be presently described.

The D.C. output voltage $R_H$ is fed to the conventional sine/cosine generator 44 as is the D.C. output voltage representing the angle Theta from the integrator 22 which may be, for example, of the type set forth in U.S. Pat. No.2,926,852 issued Mar. 1,1960. The sine/cosine generator 44 operates on the D.C. voltages $R_H$ and angle Theta to produce D.C. voltages equal to $R_H$ sine Theta and $R_H$ cosine Theta which is then fed to switch 46 and amplifiers 68,72. Thus, sine/cosine generator 44 converts from polar to rectilinear coordinates in a well known manner. Amplifier 68 controls a roll chart positioning servomotor 62 which in turn moves a roll chart 60 graphically illustrating the area to be traversed by the aircraft during a specific flight segment. Amplifier 72 controls a symbol positioning servomotor 66 which in turn moves a symbol 64 with respect to the roll chart to pictorially indicate the position of the aircraft with respect to the selected reference signal source ground station shown on the roll chart. The output shafts 76, 77 of the roll chart positioning servomotor 62 and symbol positioning servomotor 66, respectively, are connected to feedback potentiometers 74,75 in a conventional manner. The method and apparatus for selecting the proper direction of travel of the roll chart as well as the positioning of a specific chart indicative of the area to be traversed by the aircraft will be described later.

The roll chart 60 itself graphically illustrates a plurality of specific groups of charted areas which are defined by the geographic direction of the roll. There are chart directions i.e., East/West, North East/South West and etc. with each direction segment containing a series of separate charts representing an area to be traversed by the aircraft in a particular flight plan.

The system set forth in FIG. 1 and previously described, with the exception of controls 70, will enable the pilot to visually observe the flight of the aircraft by means of symbol 64 with respect to a selected reference signal ground transmitting station indicated on the roll chart 60 containing, in addition to the location of the reference signal source, a pictorial representation of the terrain over which the aircraft is flying.

Controls

In order to set up the previously described system so that a pictorial display is achieved of the aircrafts position with respect to a map of the terrain over which the aircraft is flying, the proper chart segment on roll chart 60 must be brought into position below the symbol 64 and the symbol 64 must be positioned with respect to the desired reference signal source shown on the chart segment.

In addition, information on the height of the location of the desired reference signal source above sea level must be supplied to the summing operational amplifier 58 so that the ground range of the aircraft with respect to the reference signal source can be computed. And lastly, information must be supplied to comparator 20 in order to correct bearing angle from magnetic to true north.

Figure 2:
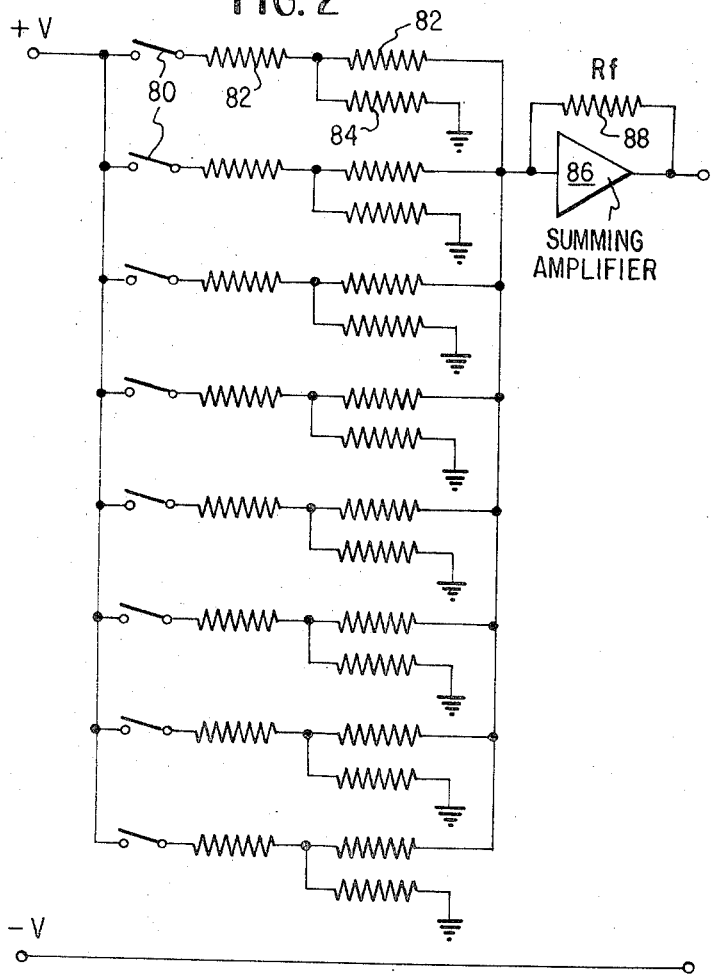
FIG. 2 is a schematic of the summing amplifier circuit.

The above information necessary to set up the pictorial navigation system as described above and shown in FIG. 1 is supplied by control 70. Control 70 is an electro-mechanical device employing solid state hybrid (analog-digital) circuits one embodiment of which can be seen by referring to FIG. 2. FIG. 2 shows one of six summing amplifier circuits, the output of which is a precise D.C. voltage representative of one of six present conditions. The six preset conditions are: (1) chart directon, (2) chart number, (3) Northing position of reference signal source, (4) Easting position of the reference signal source, (5) the height of the location of the reference signal source above sea level and (6) correction of the location of the reference signal source from magnetic to true North. The summing amplifier circuit of FIG. 2 is capable of producing a precise D.C. voltage respresentative of, for example, an eight bit word corresponding to one of the preset conditions. Specifically, chart direction (1) may be four bit word, the specific chart number (2) showing the terrain for a particular flight plan may be a eight bit word, the Northing and Easting position of the reference signal source (3,4) on the specific chart may be eight bit words and the height of the location of the reference signal source above sea level (5) as well as its variation from magnetic to true North (6) may be four and five bit words respectively.

The summing amplifier circuit of FIG. 2 comprises eight switches 80 each of which is connected in series with a conventional tee-network of resistors 82, 84 between a voltage source V+ and a summing amplifier 86 having a feedback resistor 88. Each of the series connected switches 80 and tee-network resistors 82, 84 are in turn connected in parallel with each other. Thus, if the preset condition is, for example, the height of the location of a specific reference signal source above sea level, four of the switches 80 will be closed in a manner to be described later. A precise D.C. voltage representative of the preset condition will be produced by summing amplifier 86 and fed to summing operational amplifier 58. If the preset condition was for the variation of the location of the specific reference signal source from magnetic to true North, there would be five of the switches 80, and they would be selectively closed to produce a precise D.C. voltage representative of this preset condition by summing amplifier 86 and fed to comparator 20.

By closing one or more of switches 80 corresponding to the remaining four preset conditions, additional precise D.C. voltages will be produced to thereby position the correct chart segment and define a North referenced signal source ground station on the chart segment so that an accurate pictorial display of the aircrafts position can be achieved for each segment of a flight plan.

Figure 4:
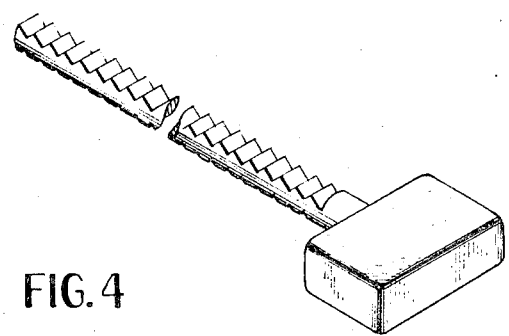
FIG. 4 is a pictorial view of a key of the present invention.

The digital words in the form of bits representing each of the six preset conditions can be contained on any one of a number of known devices which in turn can actuate the switches 80 to produce a precise D.C. voltage at the output of summing amplifier 86 representative of the preset condition. The preferred form is the use of a notched rod or key as shown in FIG. 4 having thirty or more bit locations. Each notched rod would contain all six of the preset conditions with respect to both the proper chart segment as well as the location of the reference signal source for each segment of a flight plan. The key is then inserted in a control box (not shown) located in the aircraft and rotated to thereby actuate switches 80. The output of the six summing amplifiers 86 associated with each group of switches 80 representing one of the six preset conditions could be fed to the summing operational amplifier 58, comparator 20 and roll chart and symbol 60, 64 in any desired sequence by means of, in one embodiment, a conventional stepping relay.

In a second embodiment, the tee-network of resistors and the associated summing amplifiers 86 would be replaced by a single digital to analog converter thus eliminating the above mentioned stepping relay. In other words, by using a single digital to analog converter, actuation of switches 80 would result in an immediate output of precise D.C. voltages from the digital to analog converter representing the six preset conditions.

Additional preset conditions or information can be included as bit locations on the key if desirable or necessary such as, for example, information could be supplied to modify generation of the Rho (range) input if there is variance in the map or chart scale. Further, if the system of the present invention is to be used for navigation purposes in vehicular or marine devices or for laboratory instrumentation, for example, drawing antenna patterns, an entirely different group of preset conditions or information would be provided as bit locations on the keys. If the apparatus of the present invention were used as a laboratory instrument, the symbol 64 would be replaced by an ink pen or pencil and the roll chart 60 would be replaced by a sheet of graph or similar paper.

In place of the notched key, the switches 80 could also be actuated by means of a card having protuberances or holes formed on the surface thereof. In addition, the switches 80 can be actuated by a magnetic card or an apertured card read by means of photoelectric cells.

Figure 3:
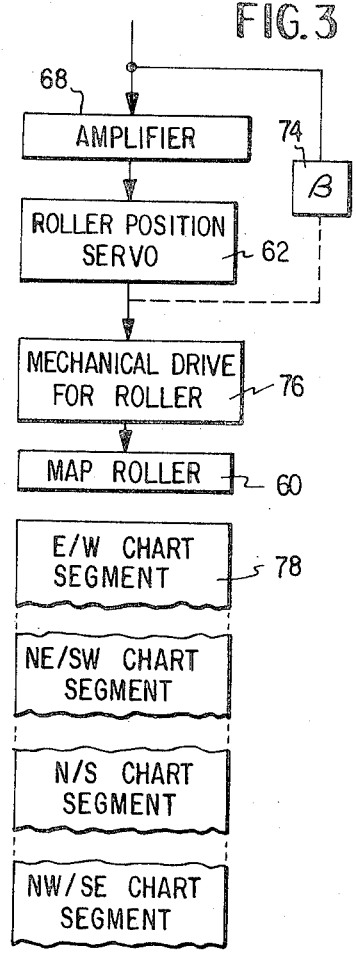
FIG. 3 is a pictorial view of the roll chart and drive means therefore.

FIG. 3 sets forth in greater detail the roll chart 60 as well as the drive means 76 therefore. Each roll chart 60 contains a number of segments 78. The segments 78 graphically display the terrain over which the aircraft is flying for each leg of a particular flight plan as well as the locations of the various reference signal sources. Thus, for example, if the system of the present invention were aboard a company or private aircraft that normally operated between Washington, Baltimore, Pittsburgh, and back to Washington, the pilot would insert a roll chart 60 containing segments for each leg of the flight plan, i.e., a chart segment for the Washington to Baltimore leg of the flight plan, etc. A key or notched rod is made for each chart segment, and the chart with its corresponding keys may be kept together in a cassette designed for the purpose when not in use.

Provision can also be made for manually selecting the proper chart segment rather than including digital information on the proper key for selecting it.

OPERATION

If the pilot wishes to fly between Washington, Baltimore, Pittsburgh, and back, he selects a roll chart 60 having segments 78 graphically displaying the area between each of these cities. The pilot also selects a cassette group of keys, each key containing information on each of the previously mentioned preset conditions with respect to the reference signal source located on each leg of the flight plan. The pilot then inserts the key representing the location first reference signal source into a box (not shown) containing switches 80. The key is then turned to actuate the switches 80.

Upon actuation of the switches 80, first and second precise D.C. voltages are fed from control 70 to amplifiers 68, 72 to indicate chart direction and to position the proper chart segment depicting the area associated with the first leg of the flight plan. A third and fourth precise D.C. voltage is fed from control 70 to amplifiers 68, 72 to establish the Northing and Easting position of the desired reference signal source on the chart segment for the first leg of the flight plan. A fifth precise D.C. voltage is then fed from control 70 to integrator 22 to again rotate bearing angle theta from magnetic to true North and lastly, a sixth precise D.C. voltage is fed from control 70 to summing operational amplifier 58 indicative of the height of the VOR-TAC ground station above sea level so that when combined with the altitude of the aircraft above sea level, the height of the aircraft above the reference signal source can be determined and the ground range of the aircraft to the location of the reference signal source can be computed in square rooting circuit 50.

After control 70 has set up the navigation system to operate on a particular reference signal in the manner described above, a signal in the form of a "beep" may be given to inform the pilot that the system is so set up to thereby give a pictorial display of the aircraft's flight with respect to the location of the source of reference signals, which signals are received by bearing signal receiver 10 and distance signal receiver 54.

While the form of embodiment of the invention as herein disclosed constitutes a preferred form it is to be understood that other forms might be adopted, as may come within the scope of the claims which follow.

What is claimed is:

1. A navigation system capable of providing a visual display of the location of a mobile craft in a given area, the location being derived from input signals transmitted from a source of reference signals and containing information as to the range and bearing of the mobile craft relative to said reference source, the system comprising:

control means adapted to be selectively preset to provide initial condition information to the system from which, along with said input signals, said location is computed and to provide initial condition information as to the area to be displayed, first converter means for converting said range information into a direct current signal corresponding thereto, altimeter means for producing an output signal corresponding to the altitude of said mobile craft relative to a reference plane, summing means for receiving said altimeter output signal and information from said control means as to the altitude of said reference source relative to said reference plane for producing an output signal indicative of the altitude of said mobile craft relative to said reference source, square root computing means for receiving the output signals from said first converter means and said summing means and for producing a direct current output signal corresponding to the ground range distance from said mobile craft to said reference source, second converter means for receiving said bearing signal and converting it into a frequency modulated signal and a amplitude modulated signal, discriminator means for extracting a frequency modulated reference phase signal from said frequency modulated signal, limiter means for extracting an amplitude modulated variable phase signal from said amplitude modulated signal, comparator means for comparing said reference phase signal with said variable phase signal and for producing a pulse width modulated signal corresponding to the result of the comparison and indicative of the bearing angle of said mobile craft relative to said reference source, integrator means for receiving said pulse width modulated signal and for producing therefrom a direct current output signal representing from 0° to 360° of bearing angle, resolving means for receiving said integrator output signal and the output signal from said square root computing means and for producing therefrom output signals corresponding to the rectilinear coordinates of the location of said mobile craft relative to said reference source and visual display means containing a portrayal of the geographical area in which said mobile craft is located and a representation of said mobile craft, said display means being responsive to the output signals from said resolver to position said portrayal and said mobile craft representation to indicate the location of said mobile craft relative to said reference source.

2. A navigation system as set forth in claim 1 wherein said first converter further comprises a buffer integrator circuit.

3. A navigation system as set forth in claim 1 wherein said comparator circuit means has additional circuit means for rotating said bearing angle such as from magnetic north to true north in response to an input signal from said control means.

4. A navigation system as set forth in claim 1 wherein said second converter comprises a buffer amplifier circuit.

5. A navigation system as set forth in claim 1 wherein said resolving means is a sine-cosine generator.

6. A navigation system as set forth in claim 1 wherein said display means further comprises roll chart means driven by a first servomotor and a symbol means representing said mobile craft driven by a second servomotor, said first and second servomotors being controlled by first and second amplifiers, respectively, in response to said rectilinear coordinate information from said resolving means to move said roll chart and said symbol means to pictorially display the symbol's position with respect to said source of reference signals.

7. A pictorial navigation system as set forth in claim 6 wherein said first and second servomotors are also controlled by said first and second amplifiers in response to said initial condition information provided by said control means, and wherein said first servomotor and first amplifier and second servomotor and second amplifier each have feedback means for accurately positioning said roll chart means and said symbol means.

8. A navigation system as set forth in claim 1 wherein said control means comprises digital to analogue converter means, said initial condition information being received in digital form, said control means producing analogue signals corresponding to said initial condition information.

9. A navigation system capable of providing a visual display of the location of a mobile craft in a given area, the location being derived from input signals transmitted from a source of reference signals and containing information as to the range and bearing of the mobile craft relative to said reference source, comprising:

resolving means having as inputs said signals from said reference source for converting said information into rectilinear coordinates, visual display means responsive to said rectilinear coordinates for providing a display of the position of said mobile craft relative to said reference source, control means adapted to be selectively preset to provide initial condition information to said resolving means from which said rectilinear coordinates can be calculated and at least one replaceable memory means containing input information for presetting said control means.

10. The navigation system defined in claim 9 wherein said memory means is a manually insertable member.

11. The navigation system defined in claim 10 wherein said control means includes a plurality of switch means selectively operable to provide voltages corresponding to said input information and wherein said insertable member is a notched rod, said notches being arranged thereon in correspondence with said input information, each said notch being capable of operating one of said plurality of switch means.

12. The navigation system defined in claim 10 wherein said control means includes a plurality of switch means selectably operable to provide voltages corresponding to said input information and wherein said insertable member is a card means having markings arranged thereon in correspondence with said input information, each said marking being capable of operating at least one of said plurality of switch means.

13. The navigation system defined in claim 9 wherein said visual display means comprises a roll chart having a portrayal of the geographical area in which said mobile craft is located and a representation of said mobile craft, said roll chart being responsive to the output signals from said resolving means to position said portrayal and said mobile craft representation to indicate the location of said mobile craft relative to said reference source and wherein said memory means contains the following information: direction of chart travel, the identity of the chart for the area to be traversed by said mobile craft, the northing and easting positions of said reference signal source, the altitude of said reference signal source relative to a reference plane and the correction of the magnetic to the true north position of said reference signal source.

14. The navigation system defined in claim 9 wherein said memory means contains said input information in digital form, said navigation system further comprising a digital to analogue converter for converting said input information into analogue voltages corresponding to said input information.

* * * * *